US012680334B2

(12) United States Patent
Shoshan

(10) Patent No.: US 12,680,334 B2
(45) Date of Patent: Jul. 14, 2026

(54) RECESSED DOOR HANDLE CONTROL

(71) Applicant: Panda Windows and Doors Operations LLC, North Las Vegas, NV (US)

(72) Inventor: Avi Shoshan, Las Vegas, NV (US)

(73) Assignee: Panda Windows and Doors Operations LLC, North Las Vegas, NV (US)

( * ) Notice: Subject to any disclaimer, the term of this patent is extended or adjusted under 35 U.S.C. 154(b) by 0 days.

(21) Appl. No.: 18/904,331

(22) Filed: Oct. 2, 2024

(65) Prior Publication Data

US 2026/0092472 A1 Apr. 2, 2026

(51) Int. Cl.
*E05B 5/00* (2006.01)

(52) U.S. Cl.
CPC .................................... *E05B 5/006* (2013.01)

(58) Field of Classification Search
CPC ........................................................ E05B 5/006
USPC ............................................................ 70/208
See application file for complete search history.

(56) References Cited

U.S. PATENT DOCUMENTS 6,550,296 B2 * 4/2003 Segawa ................. E05B 13/103 70/284
6,709,034 B2 * 3/2004 Michael .............. E05B 65/0864 292/169.18
8,496,277 B2 * 7/2013 Commons ................. E05B 5/00 292/DIG. 31
8,646,819 B2 * 2/2014 Do ......................... B64D 29/06 292/228
9,957,740 B2 * 5/2018 Goetze ....................... E05C 9/02
11,781,355 B1 * 10/2023 Lammers ............ E05D 15/0634 16/105
2003/0121299 A1 * 7/2003 Graham ................ H04L 67/306 70/208
2003/0226384 A1 * 12/2003 Shedd ................. E05B 65/0876 70/208

FOREIGN PATENT DOCUMENTS

EP 4108856 A1 * 12/2022 ............. E05B 1/003
KR 20060092652 A * 8/2006 ............... E05C 3/12

* cited by examiner

*Primary Examiner* — Nathan Cumar

(74) *Attorney, Agent, or Firm* — Weiss and Moy P.C.; Jeffrey D. Moy

(57) ABSTRACT

A handle for sliding panels has a handle shell with a recess, where the handle shell is fixedly attached to a slidable panel. A clutch is housed within the handle shell, and an elongated square bar is in mechanical communication with the clutch. The elongated square bar extends outward from the handle shell and into the panel. A retractable handle is housed in the recess, the retractable handle having a circular hinge with a slot that provides a hinged and rotatable attachment to the clutch.

18 Claims, 11 Drawing Sheets

RECESSED DOOR HANDLE CONTROL

TECHNICAL FIELD

This present invention relates generally relates to sliding door or sliding window assemblies, and more particularly, to a rotatable recessed handle with a user selectable clutch for engaging and disengaging a sliding system for positioning control of the sliding door or sliding window assemblies.

BACKGROUND

Sliding door panels and sliding window panels are a popular design choice for both residential and non-residential structures. Sliding panels are a design solution that opens up space in the home and in non-residential settings. Sliding panels that extend from floor to ceiling are an effective way to divide a room for hosting parties or large get-togethers that require more space than one room can handle, and are a popular choice for efficiently opening up large expanses. Large framed sliding glass panels may be used as an exterior potion of a structure to allow for large amounts of natural light to enter, allow occupants to better see their exterior surroundings, while also allowing for a large egress/ingress opening.

However, large sliding panels, especially panels having a large surface area of glass can be very heavy and difficult to move. A lift and slide system has been developed that allows for panels as large as one hundred square feet while retaining the ability to be operated with one finger. Lift and slide systems employ a system of levers and wheels to raise a panel when movement of the panel is desired and the wheels travel along a track, and when movement of the panel is no longer desired, the panel can be dropped to a floor sill, compressing gaskets, such as double V-gaskets, against the floor, sides, and top of the panel. The gaskets are designed to create an airtight and watertight seal around each panel. The result is a sliding panel system remarkably weatherproof and secure against forced entry. For an external sliding wall system, a heavy-duty lift and slide system is more than capable of withstanding heavy winds and rain. The impact line of lift and slide doors is even capable of surviving hurricane-strength forces.

While there have been many advances in sliding window and sliding door systems there continues to be a need for improved door handles and controls for actuating lift and slide panel systems.

SUMMARY

According to an embodiment of the disclosure, a handle is provided for sliding panels that has a handle shell with a recess, where the handle shell is fixedly attached to a slidable panel. A clutch is housed within the handle shell, and an elongated square bar is in mechanical communication with the clutch. The elongated square bar extends outward from the handle shell and into the panel. A retractable handle is housed in the recess, the retractable handle having a circular hinge with a slot that provides a hinged and rotatable attachment to the clutch.

According to an embodiment of the disclosure, a sliding panel system is provided. The system includes one or more sliding panels and a set of one or more tracks on which the one or more panels slide on with a set of wheels, a gear box that raises and lowers the set of wheels of the one or more sliding panels; at least one handle shell with a recess, the handle shell fixedly attached to at least one slidable panel; a clutch housed within the handle shell; an elongated square bar in mechanical communication with the clutch and the gearbox, the elongated square bar extends outward from the handle shell and into the panel; and a retractable handle housed in the recess, the retractable handle having a circular hinge with a slot that provides a hinged and rotatable attachment to the clutch.

According to an embodiment of the disclosure, a method is provided of using the system disclosed herein. The method includes lifting the retractable handle housed in the recess of the handle shell, and rotating the retractable handle by 180 degrees to raise or lower the panel.

BRIEF DESCRIPTION OF THE DRAWINGS

The present invention is further detailed with respect to the following drawings that are intended to show certain aspects of the present invention, but should not be construed as a limit on the practice of the present invention.

It is understood that like reference characters refer to like elements throughout the several figures.

DETAILED DESCRIPTION

Figure 1A:
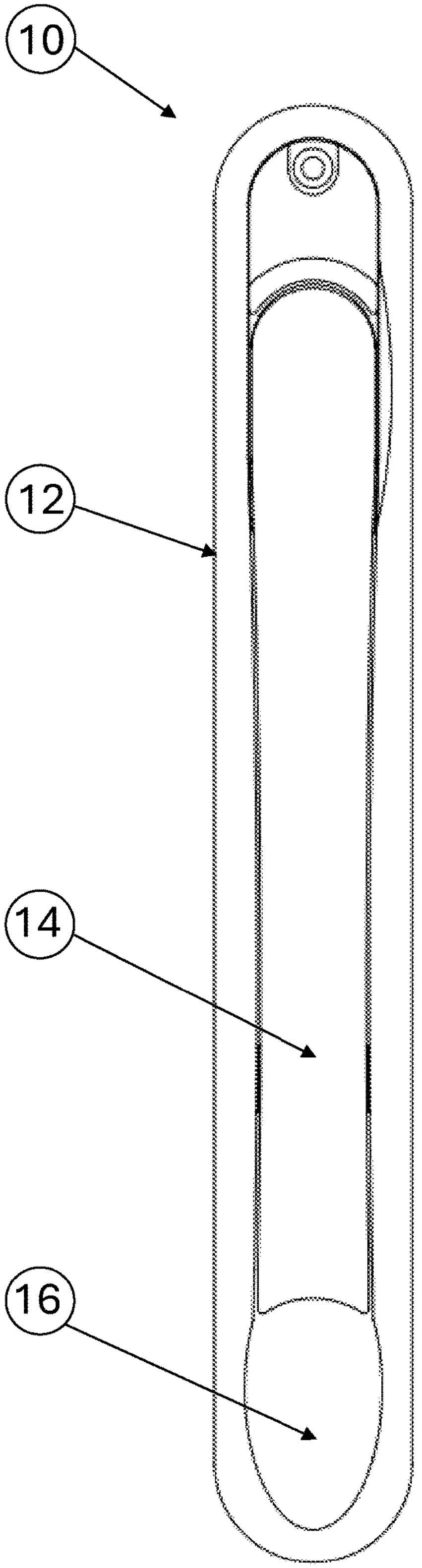
FIGS. 1A-1D illustrate a front view, a rear view, a side view, and a perspective view, respectively, of a handle control in accordance with embodiments of the invention.

A handle assembly is provided with a rotatable and retractable recessed handle that controls a selectable clutch for engaging and disengaging a sliding system for positioning control of sliding door or sliding window assemblies, herein referred to as a sliding panel. In embodiments of the inventive handle assembly, the retractable recessed handle is stored or recessed in a handle shell, where the handle shell is fixedly secured to the sliding panel. In a normal/rest position the retractable handle sits flush within the handle shell. In operation, the retractable recessed handle is pulled outward from the handle shell and rotated via a clutch to engage a set of wheels via a clutch that lift the panel to facilitate movement of the panel along a track, and when movement of the panel is no longer desired, the panel can be lowered or dropped to a floor sill by rotating the retractable recessed handle in the opposite direction. The retractable recessed handle can then be stowed away into its recessed position within the handle shell. In embodiments, the clutch allows for operation of the retractable handle without engaging or disengaging the set of wheels. In a specific embodiment for use with panel lift and slide systems of Panda Windows & Doors, LLC, rotation of the retractable recessed handle of 180 degrees clockwise engages a set of lift & slide wheels, and with activation of the built-in clutch the subsequent turning of the handle 180 degrees counterclockwise returns the panel to a resting position. The handle can then be stowed away into its recessed position. It is appreciated that with adjustments to the clutch mechanism, the extent of rotation of the retractable handle to raise and lower the panel may be possible. For example, a 90 degree clockwise and subsequent 90 degree counterclockwise rotation of the retractable handle may be used to control the lifting and lowering of a panel. In an additional exemplary embodiment, rotation of plus or minus 90 degrees from the retractable handle rest or stowed position may be used to raise and lower the sliding panel.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The preferred embodiments of the present invention will be hereinafter described with reference to the figures.

Figure 1B:
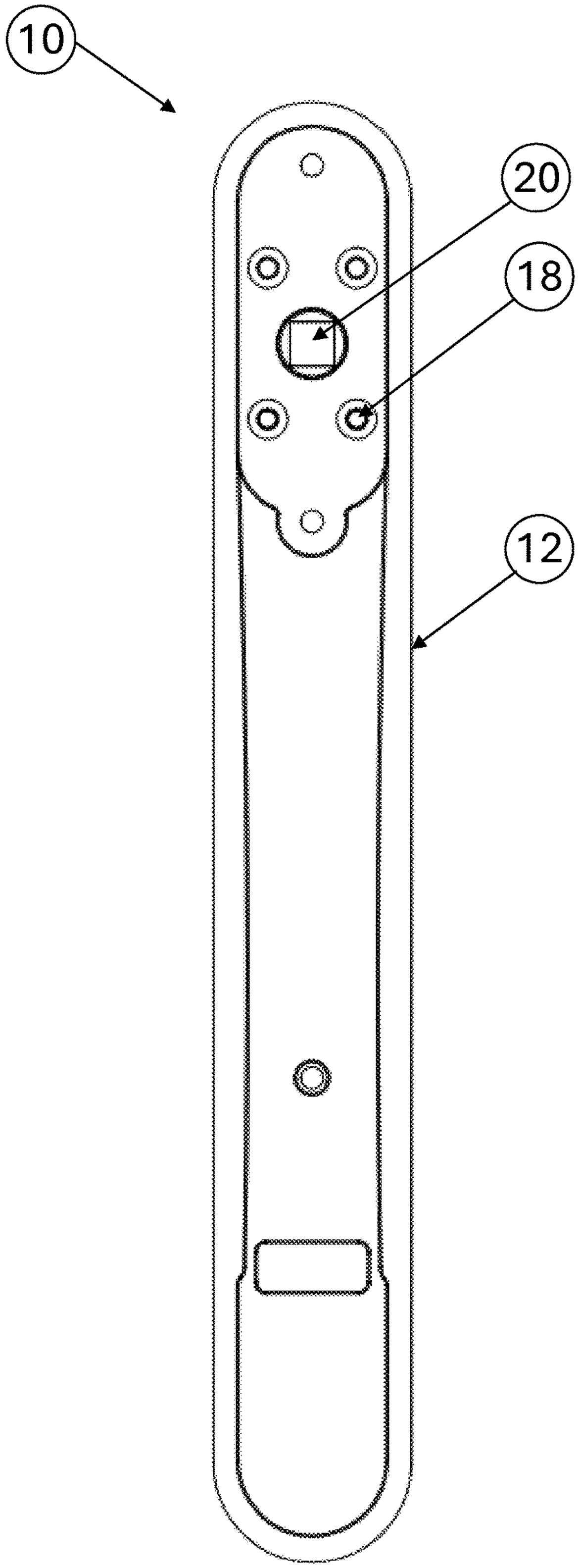
Figure 1C:
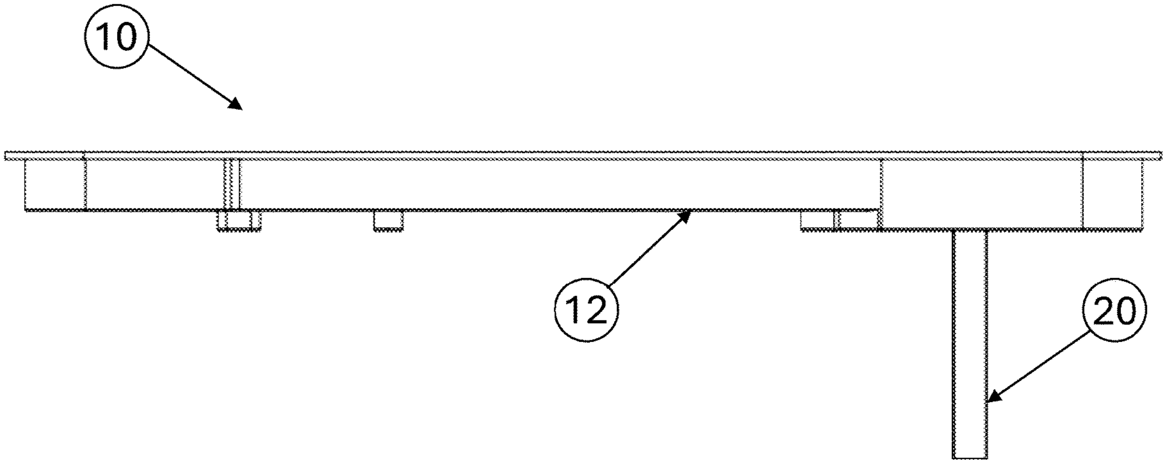
Figure 1D:
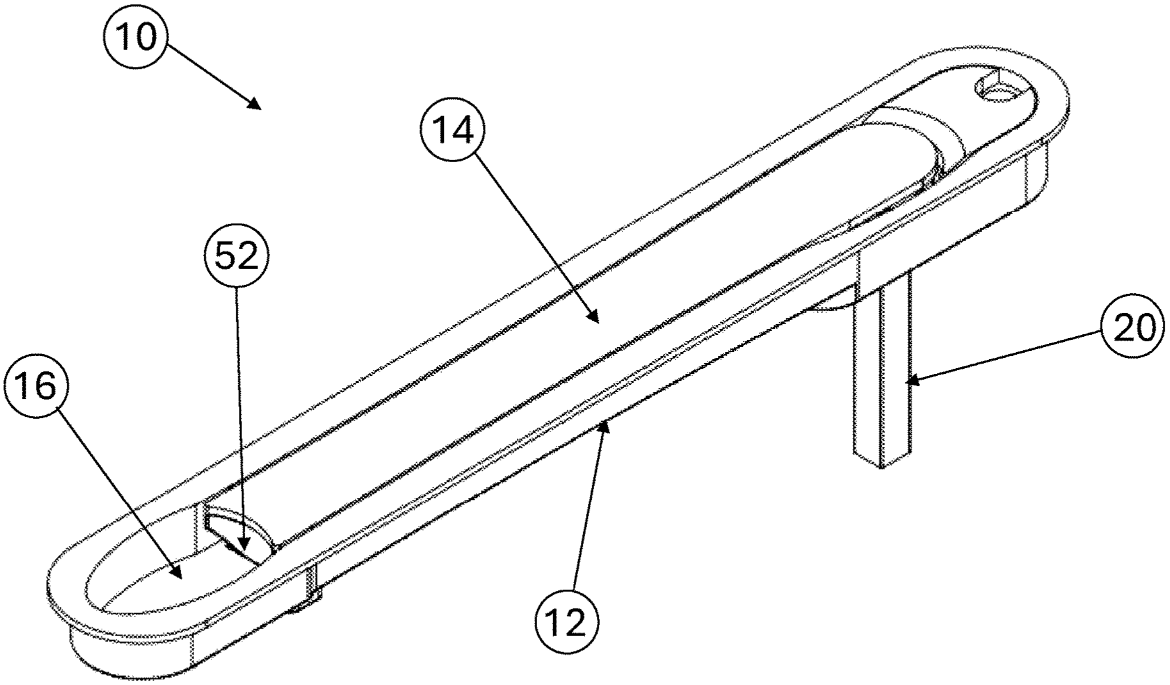

FIGS. 1A-1D illustrate a front view, a rear view, a side view, and a perspective view, respectively, of a handle control 10. As shown in FIG. 1A, the front view of a handle shell 12 provides a recess for a retractable handle 14 with a finger well 16 to enable the retractable handle 14 via end nub 52 to be pulled out by a user. As best shown in FIG. 1B, in the rear view of the handle shell 12 a number of holes 18 are provided in the handle shell 12 to secure the handle shell 12 to a panel with securements illustratively including screws. As shown in FIGS. 1C and 1D an elongated square bar 20 extends from the handle control 10 and inserts into a gearbox 60 (see FIG. 8) of a lift and slide mechanism of a panel.

Figure 2:
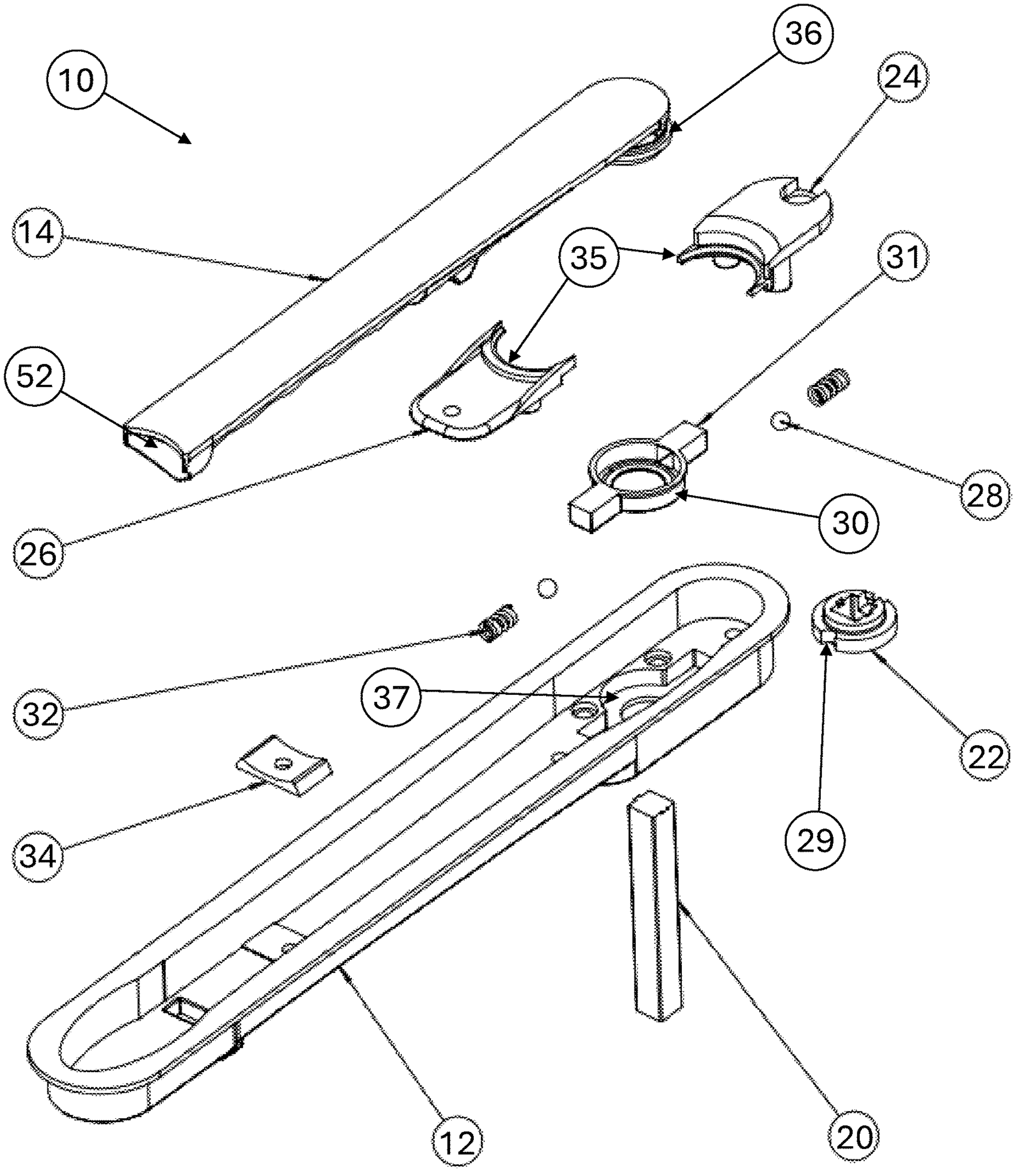
FIG. 2 is an exploded view of the handle control as shown in FIGS. 1A-1D in accordance with embodiments of the invention.
Figure 7:
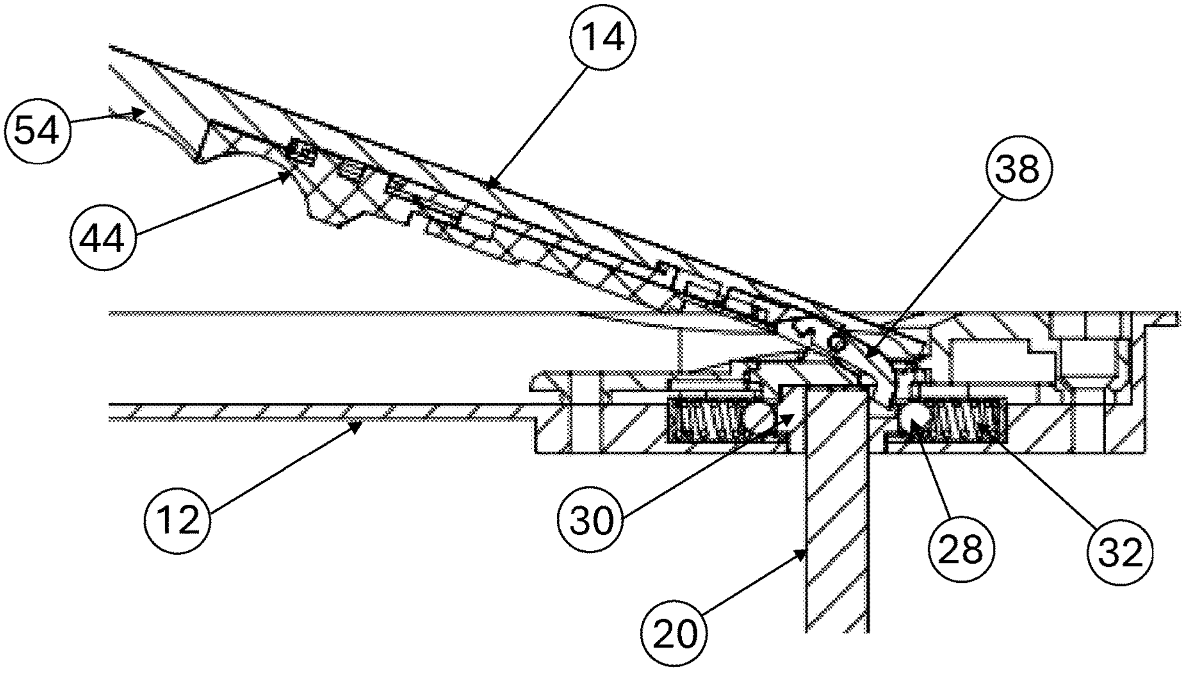
FIG. 7 is a side sectional view of the recessed handle control with the pull out handle pulled from the handle shell, and the finger push in the top position, where rotating the pull out handle back into normal/rest position without rotating the square bar again leaving the mechanism in the desired locked or unlocked position in accordance with embodiments of the invention.
Figure 8:
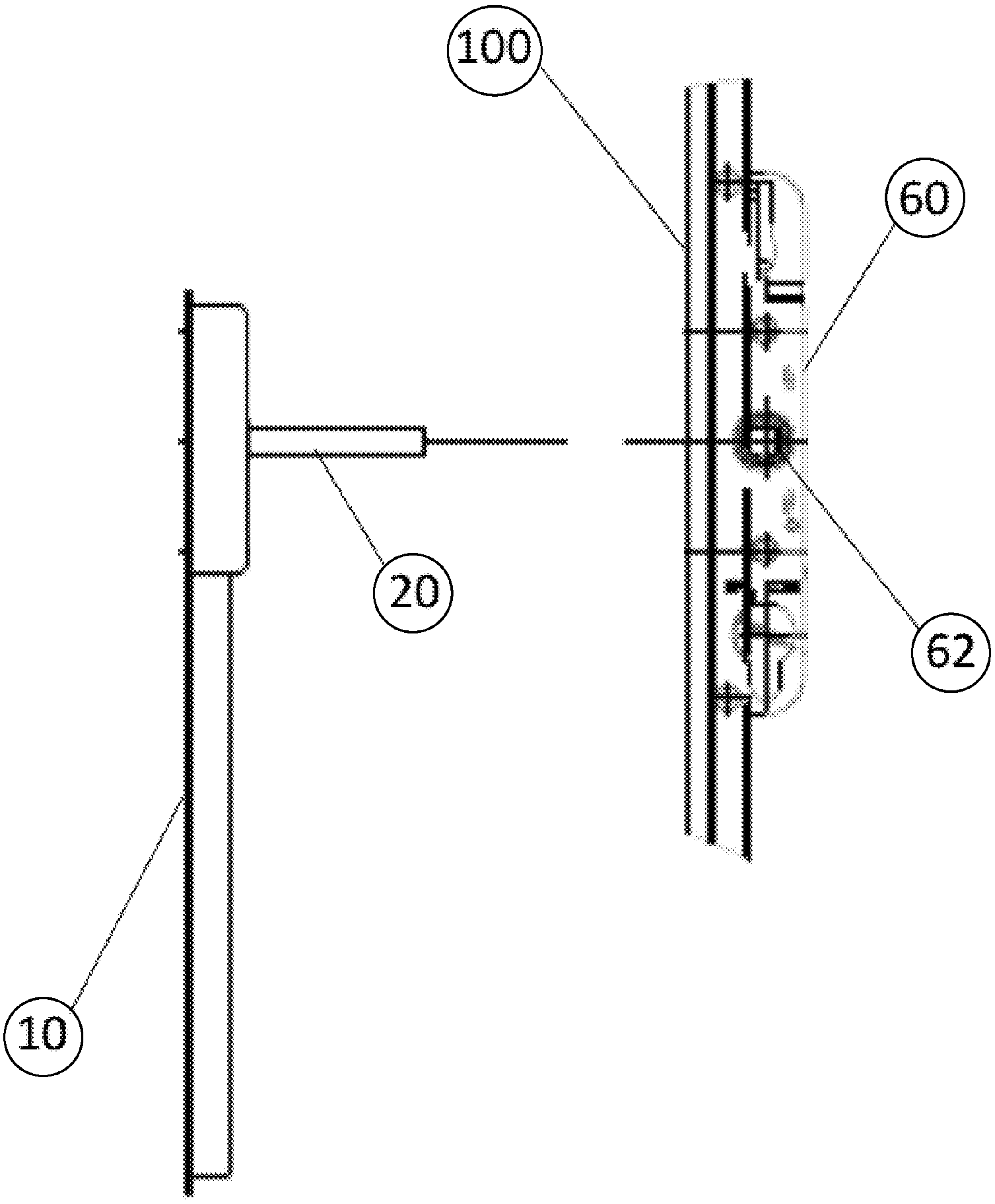
FIG. 8 is a side view showing the relationship between square bar extending from the handle control and the gearbox for the lift and slide mechanism in accordance with embodiments of the invention.

FIG. 2 is an exploded view of the handle control 10 as shown in FIGS. 1A-1D and illustrates the components of a clutch housed within the handle shell 12. whose operation is more fully described in FIGS. 7 and 8. The clutch includes a square bar holder 22, which may be made of a metal illustratively including zinc that engages with the elongated square bar 20. The square bar holder 22 sits in a plastic bar holder 30 made of plastic illustratively including nylon. The plastic bar holder 30 has opposing winglets 31 that each hold a metal ball bearing 28 that is inwardly biased toward the square bar holder 22 by a ball helical spring 32. The square bar holder 22 has rounded indents 29 on opposing sides that interact with the ball bearings 28 to provide a locking action when the ball bearings 28 are positioned in the rounded indents 29. When the elongated square bar 20 and square bar holder 22 are rotated the metal ball bearings 28 are pushed away and compress the springs 32 allowing the square bar holder 22 to rotate. In an exemplary embodiment once the 180° rotation is complete the balls spring back into place.

The handle shell 12 has a cavity 37 that is shaped to correspond to the shape of the plastic bar holder 30 with opposing winglets 31 so as to hold the plastic bar holder 30 in a stationary position when the retractable handle 14 is rotated. A top screw plate 24 and a bottom screw plate 26 form a channel groove 35 that retains a circular hinge 36 that actuates within the groove 35 when the retractable handle 14 is rotated. The circular hinge 36 is attached to the square bar holder 22 such that rotation of the retractable handle 14 actuates the square bar holder 22 and the elongated square bar 20 as well when the ball bearings 28 are not engaged with the square bar holder 22. The retractable handle 14 is pivotally attached to the circular hinge 36. Rubber stopper 34 acts as a cushioned resting point for the retractable handle 14 when the retractable handle is returned to the recessed position in the handle shell 12.

Figure 3:
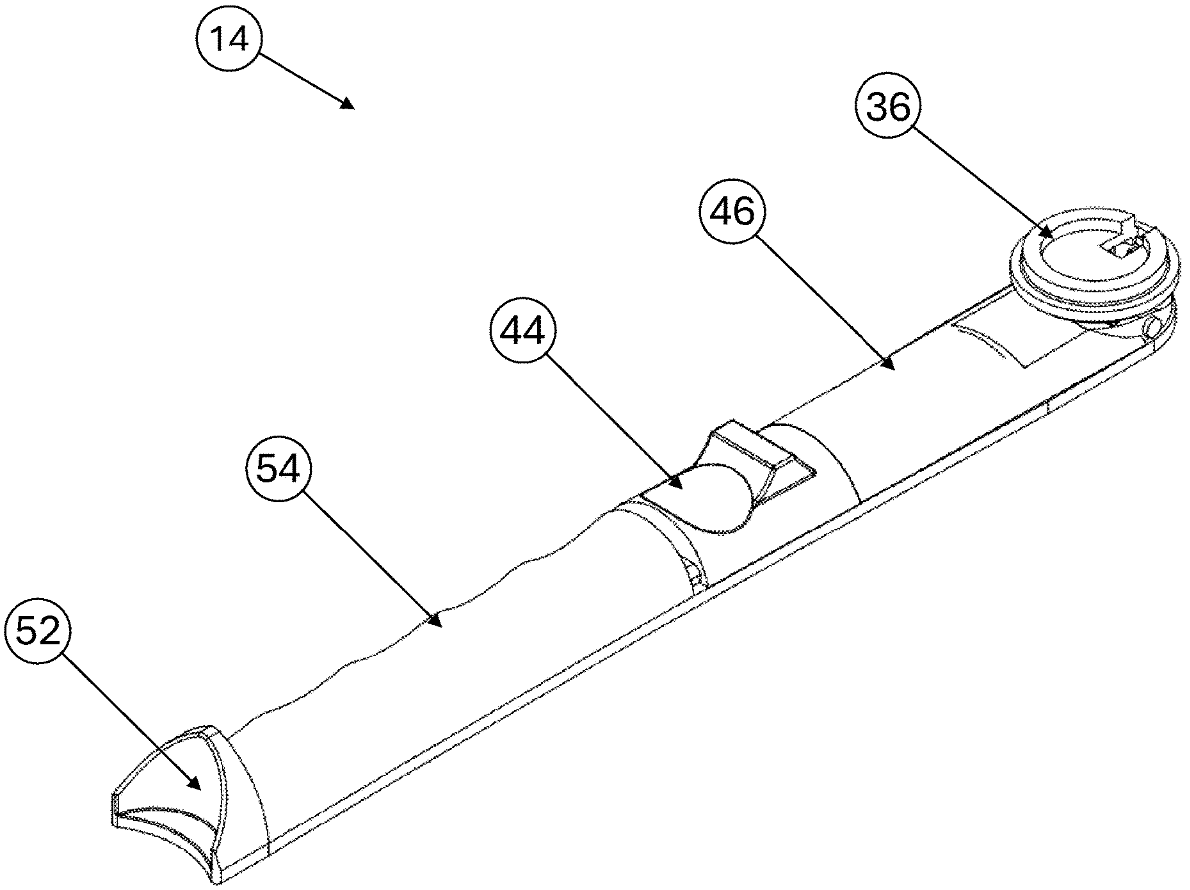
FIG. 3 is a perspective view of the inward facing pull out portion of the handle control in accordance with embodiments of the invention.
Figure 4:
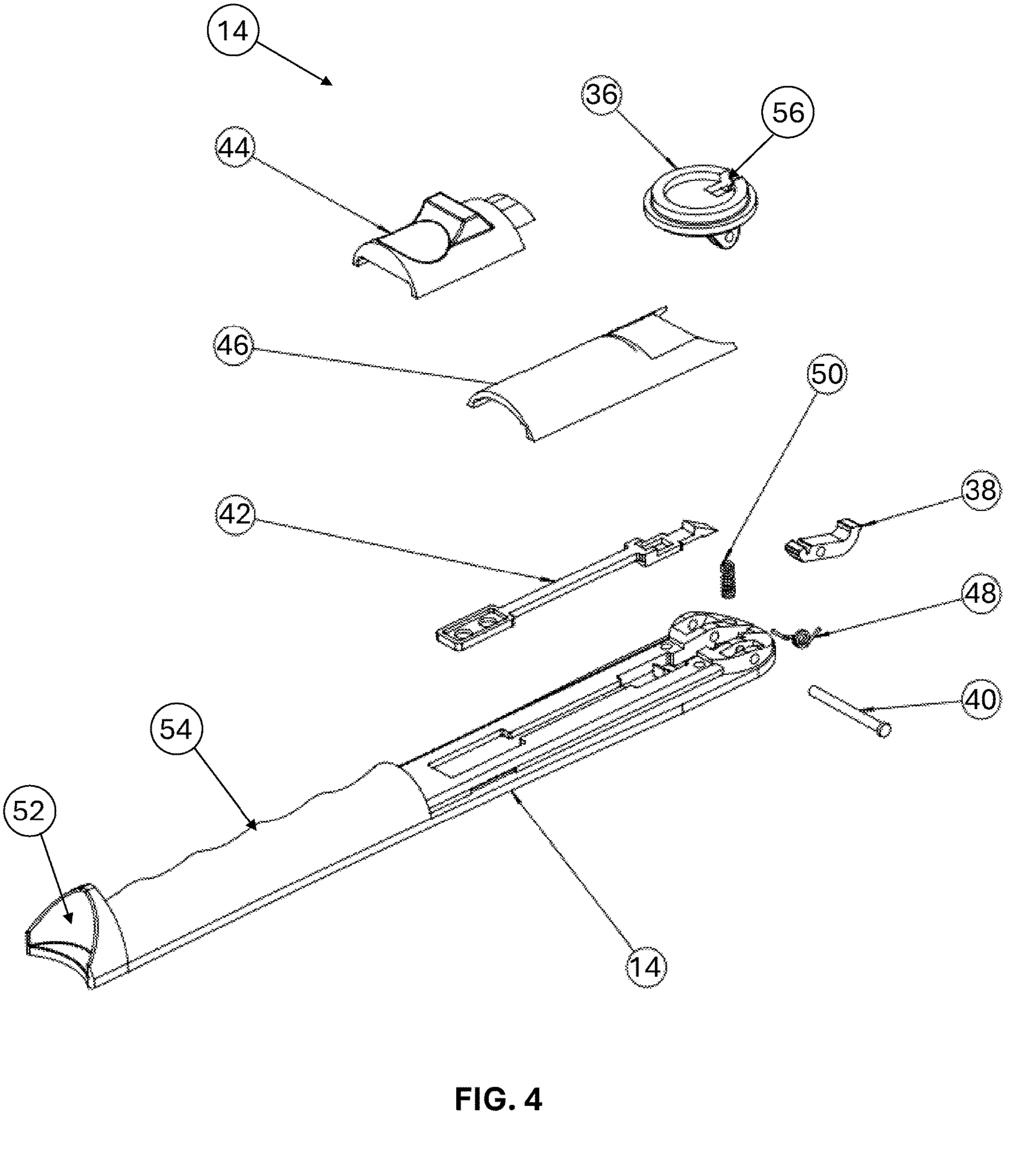
FIG. 4 is an exploded view of the inward facing pull out handle of the handle control, respectively, in accordance with embodiments of the invention.

FIG. 3 and FIG. 4 are an upside-down perspective view and upside-down exploded view of the inward facing portion of the retractable handle 14 of the handle control 10, respectively. Visible in FIG. 3 is the circular hinge 36, top cover 46, finger push 44, grip area 54, and end nub 52.

Figure 5:
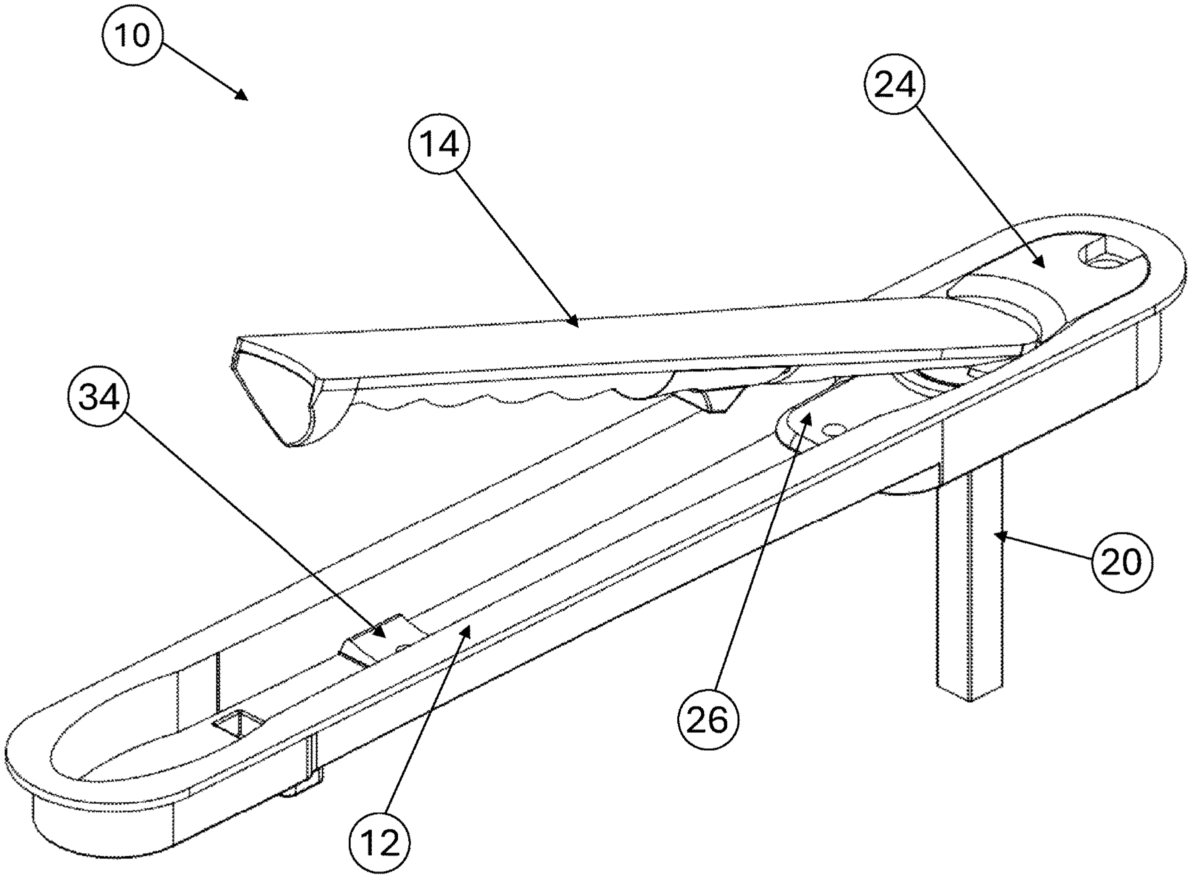
FIG. 5 is a perspective view of the recessed handle control with the pull out handle lifted from the handle shell in accordance with embodiments of the invention.
Figure 6:
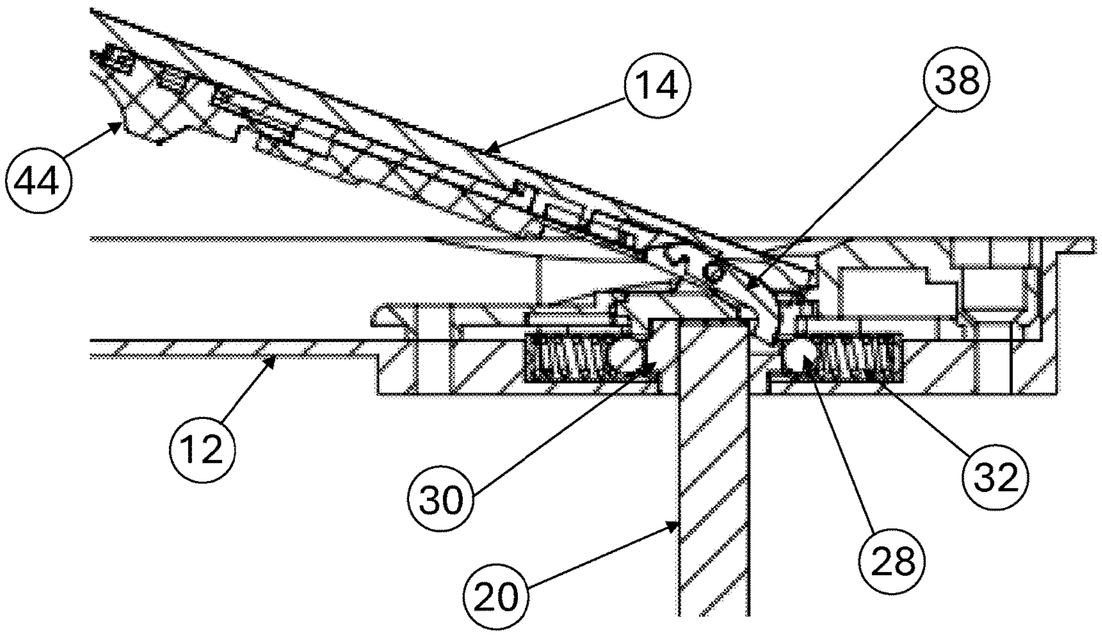
FIG. 6 is a side sectional view of the recessed door handle control with the pull out handle pulled from the handle shell, and the finger push in the bottom position, where rotating the pull out handle will cause the metal square bar to rotate as well. in accordance with embodiments of the invention.

FIG. 4 illustrates the moving and pivoting parts of the retractable handle 14, the action of which are shown in FIG. 6 and FIG. 7. The retractable handle 14 is pivotally attached to the circular hinge 36 with pin 40, which may be made of metal. Hook 38, which may be made of metal, is biased by torsion spring 48 in a default engaged position. The hook 38 disengages with slot 56 of circular hinge 36 when push bar 42, which may be made of metal, is pushed inward toward the hook 38 with the finger push 44 that is fixedly attached to the push bar 42. The finger push 44 may be made of plastic. Helical spring 50 provides an outward push bias when the retractable handle 14 is lifted via the nub 52. FIG. 5 is a perspective view of the handle control 10 with the pull-out retractable handle 14 lifted from the handle shell 12.

FIG. 6 is a side sectional view of the handle control 10 with the retractable handle 14 pulled from the handle shell 12, and the finger push 44 not being pressed such that the push bar 42 does not interact with the hook 38, and the hook 38 engages with slot 56 of the circular hinge 36. With the hook engaged with slot 56 the rotation of the pulled out retractable handle 14 will cause the metal square bar 20 to rotate as well, and allowing the lift and slide system to be locked or unlocked by rotating the handle 180°. This occurs due to the hook 38 that rests between the retractable handle 14 and the square bar holder 22. A torsion spring 48 on the opposite side of the hook 38 keeps the hook 38 in position.

FIG. 7 is a side sectional view of the handle control 10 with the retractable handle 14 pulled from the handle shell 12, and the finger push 44 pushed such that the push bar 42 is in contact with the hook 38, and the hook 38 is not engaged with slot 56 of the circular hinge 36. In this instance the rotation of the retractable handle 14 will not rotate the square bar 20 leaving the panel in a raised or lowered position when the retractable handle 14 is placed back in the recessed position in the handle shell 12.

FIG. 8 is a side view showing the relationship between square bar 20 extending from the handle control 10 and the gearbox 60 for the lift and slide mechanism positioned in sliding panel 100. The square bar 20 inserts into the square aperture 62 and actuates the lift and slide mechanism when the clutch assembly is engaged with the retractable handle 14, and the retractable handle 14 is rotated.

Figure 9:
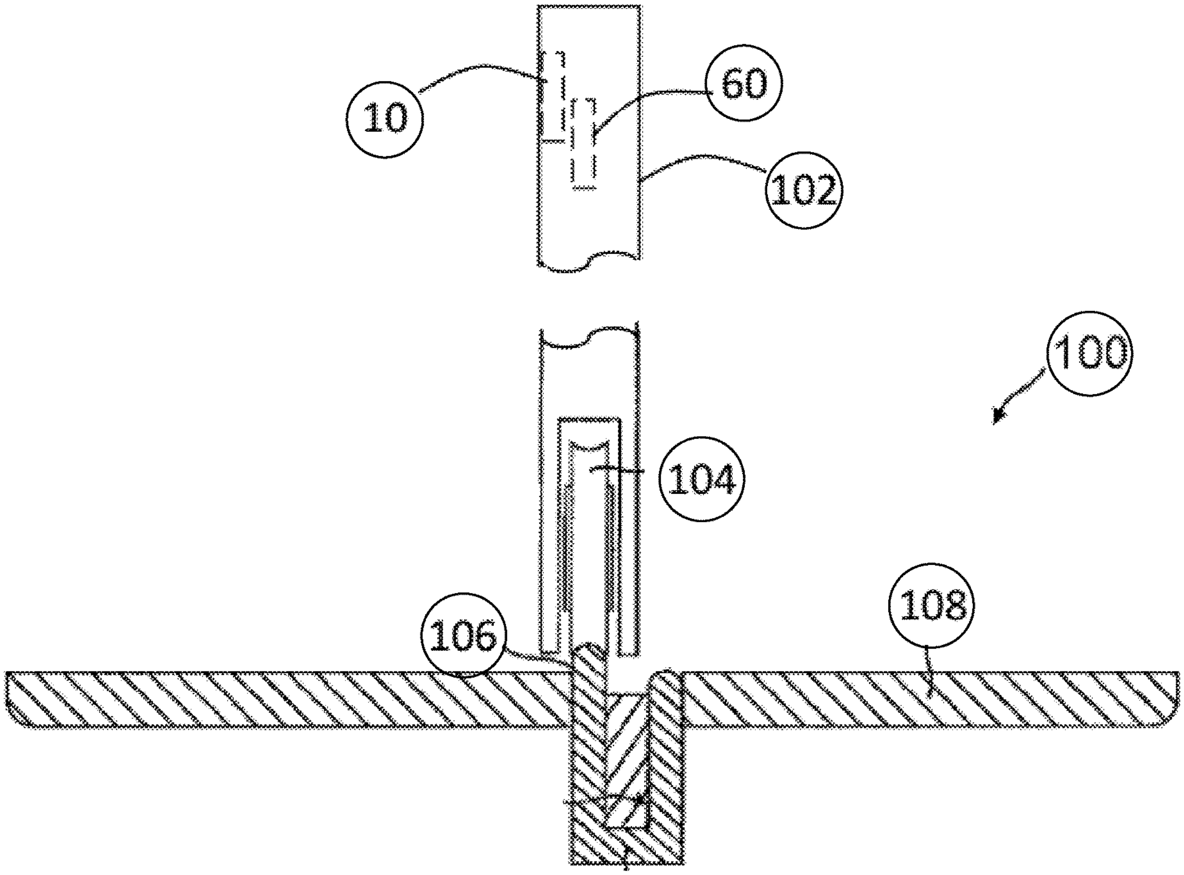
FIG. 9 illustrates a cross-sectional view of a bottom of a sliding panel equipped with the handle control in a raised position with a wheel on a track in embodiments of the invention.

FIG. 9 illustrates a cross-sectional view of a system 100 with a sliding panel 102 equipped with the inventive handle control 10 and gearbox 60 within the panel 102. The panel 102 is in a raised position with a wheel 104 on a track 106 positioned on a floor 108.

Figure 10:
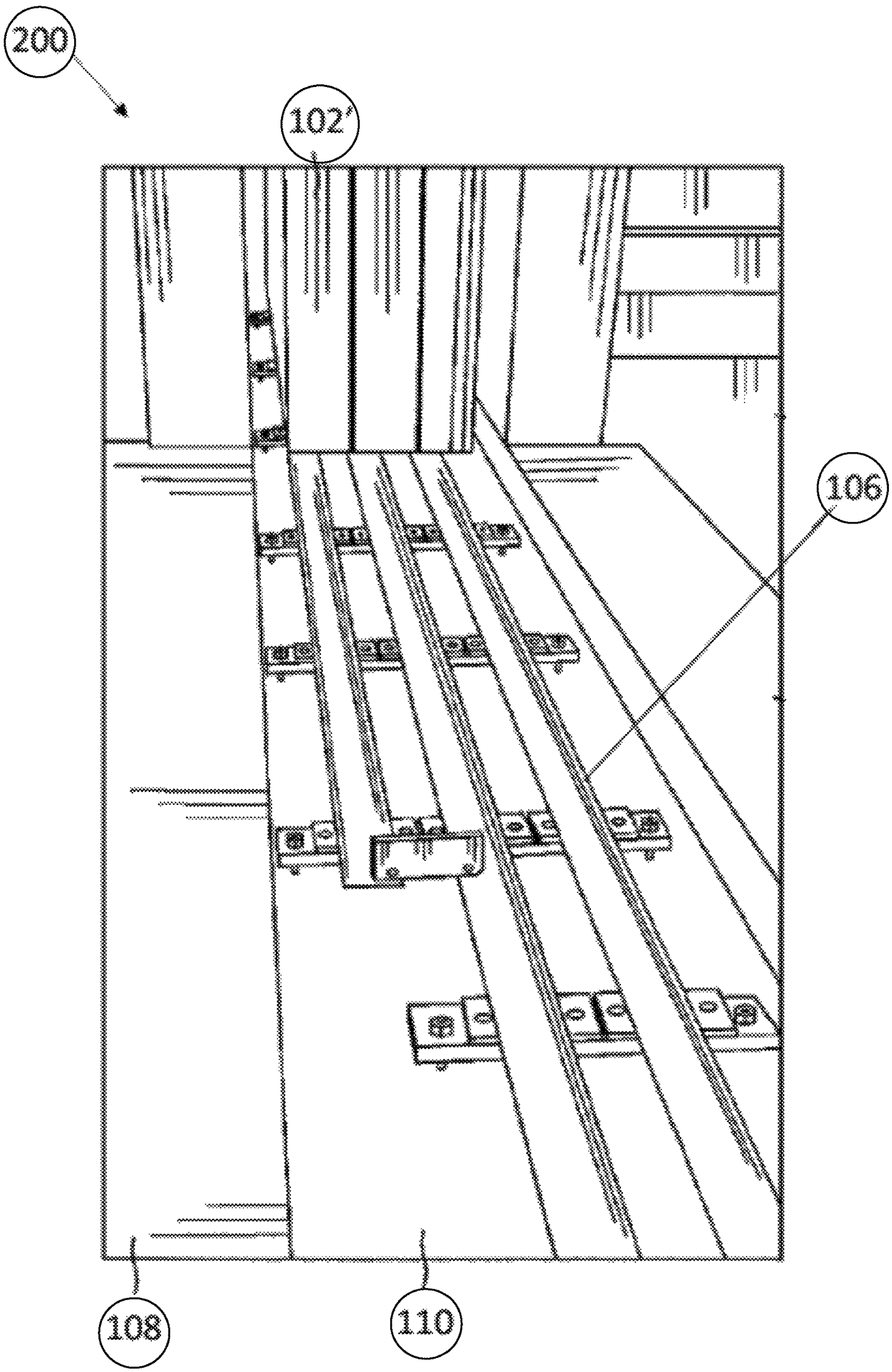
FIG. 10 is a perspective view with part of the flooring removed to expose the tracks on which the sliding panel equipped with the handle control rides on in accordance with embodiments of the invention.

FIG. 10 is a perspective view of a sliding multi-panel system 200 having the inventive handle control 10 with part of the flooring 108 removed to expose the tracks 106 and underfloor 110 on which the sliding panels 102' equipped with the recessed handle control 10 ride on.

Figure 11:
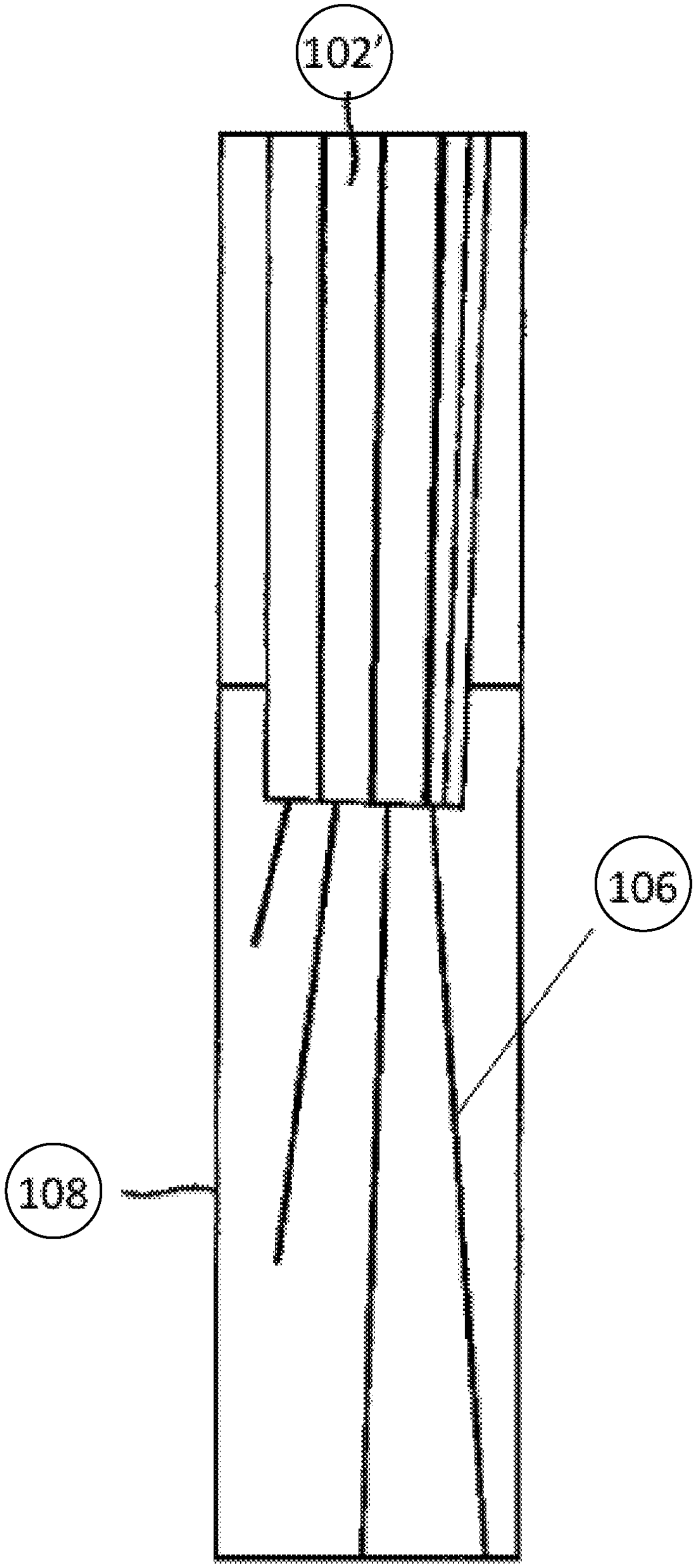
FIG. 11 is a perspective view of the sliding panel equipped with the handle control resting on the floor in accordance with embodiments of the invention.

FIG. 11 is a perspective view of the sliding multi-panel system 200 equipped with the recessed handle control 10 resting on the floor.

While the preferred embodiments of the present invention have been disclosed herein, it will be appreciated that modification of these particular embodiments of the invention may be resorted to without departing from the scope of the invention as found in the appended claims.

Various modifications of the present invention, in addition to those shown and described herein, will be apparent to those skilled in the art of the above description. Such modifications are also intended to fall within the scope of the appended claims.

The foregoing description is illustrative of particular embodiments of the invention, but is not meant to be a limitation upon the practice thereof. The following claims, including all equivalents thereof, are intended to define the scope of the invention.

The invention claimed is:

1. A handle for sliding panels comprising:
- a handle shell with a recess, the handle shell fixedly attached to a slidable panel;
- a clutch housed within the handle shell;
- an elongated square bar in mechanical communication with the clutch, the elongated square bar extends outward from the handle shell and into the panel; and
- a retractable handle housed in the recess, the retractable handle having a circular hinge with a slot that provides a hinged and rotatable attachment to the clutch;
- wherein the clutch comprises:
- a square bar holder that is fixedly attached to the elongated square bar;
- a bar holder in which the square bar holder sits and is free to rotate, the bar holder having opposing winglets, each of the opposing winglets having a ball bearing that is inwardly biased toward the square bar holder by a ball helical spring;
- a hook biased by a torsion spring in a default engaged position with the slot of the circular hinge of the retractable handle; and
- wherein the square bar holder has rounded indents on opposing sides that interact with the ball bearings to provide a locking action when the ball bearings are positioned in the rounded indents;
- wherein the handle shell has a cavity that is shaped to correspond to the shape of the bar holder with opposing winglets so as to hold the bar holder in a stationary position when the retractable handle is rotated; and
- wherein when the elongated square bar and square bar holder are rotated the ball bearings are pushed away and compress the helical springs allowing the square bar holder to rotate.

2. The handle of claim 1 wherein the recess of the handle shell further comprises a finger well to enable the retractable handle to be pulled outward by a user via an end nub on a proximal end of the retractable handle.

3. The handle of claim 1 further comprising a top screw plate and a bottom screw plate that form a channel groove that retains the circular hinge that actuates within the groove when the retractable handle is rotated; and
- wherein the circular hinge is attached to the square bar holder such that rotation of the retractable handle actuates the square bar holder and the elongated square bar as well when the ball bearings are not engaged with the square bar holder.

4. The handle of claim 1 wherein the bar holder is made of a plastic including nylon.

5. The handle of claim 1 wherein the retractable handle further comprises a finger push fixedly attached to a push bar.

6. The handle of claim 5 wherein when the finger push is actuated toward the circular hinge the push bar disengages the hook from the slot of the circular hinge of the retractable handle.

7. The handle of claim 1 wherein the retractable handle further comprises a grip area.

8. The handle of claim 1 wherein the sliding panels are at least one of window panels or door panels.

9. A sliding panel system comprising:
- one or more sliding panels and a set of one or more tracks on which the one or more panels slide on with a set of wheels;
- a gear box that raises and lowers the set of wheels of the one or more sliding panels;
- at least one handle shell with a recess, the handle shell fixedly attached to at least one slidable panel;
- a clutch housed within the handle shell;
- an elongated square bar in mechanical communication with the clutch and the gearbox, the elongated square bar extends outward from the handle shell and into the panel; and
- a retractable handle housed in the recess, the retractable handle having a circular hinge with a slot that provides a hinged and rotatable attachment to the clutch;
- wherein the clutch comprises;
- a square bar holder that is fixedly attached to the elongated square bar;
- a bar holder in which the square bar holder sits and is free to rotate, the bar holder having opposing winglets, each of the opposing winglets having a ball bearing that is inwardly biased toward the square bar holder by a ball helical spring;

a hook biased by a torsion spring in a default engaged position with the slot of the circular hinge of the retractable handle; and wherein the square bar holder has rounded indents on opposing sides that interact with the ball bearings to provide a locking action when the ball bearings are positioned in the rounded indents;

wherein the handle shell has a cavity that is shaped to correspond to the shape of the bar holder with opposing winglets so as to hold the bar holder in a stationary position when the retractable handle is rotated; and wherein when the elongated square bar and square bar holder are rotated the ball bearings are pushed away and compress the helical springs allowing the square bar holder to rotate.

10. The system of claim 9 wherein the recess of the handle shell further comprises a finger well to enable the retractable handle to be pulled outward by a user via an end nub on a proximal end of the retractable handle.

11. The system of claim 9 further comprising a top screw plate and a bottom screw plate that form a channel groove that retains the circular hinge that actuates within the groove when the retractable handle is rotated; and wherein the circular hinge is attached to the square bar holder such that rotation of the retractable handle actuates the square bar holder and the elongated square bar as well when the ball bearings are not engaged with the square bar holder.

12. The system of claim 11 wherein the retractable handle further comprises a finger push fixedly attached to a push bar.

13. The system of claim 12 wherein when the finger push is actuated toward the circular hinge the push bar disengages the hook from the slot of the circular hinge of the retractable handle, and rotation of the retractable handle will not rotate the square bar leaving the panel in a raised or lowered position when the retractable handle is placed back in the recessed position in the handle shell.

14. The system of claim 9 wherein the bar holder is made of a plastic including nylon.

15. The system of claim 9 wherein the retractable handle further comprises a grip area.

16. The system of claim 9 wherein the sliding panels are at least one of window panels or door panels.

17. A method of using system of claim 9 comprising:

lifting the retractable handle housed in the recess of the handle shell; and rotating the retractable handle by 180 degrees to raise or lower the panel.

18. The method of claim 17 wherein if a finger push on the retractable handle is pushed the panel will remain in a raised or lowered position when the retractable handle is placed back in the recessed position in the handle shell.

* * * * *